Patented Nov. 25, 1941

2,263,894

UNITED STATES PATENT OFFICE 2,263,894

TETRAKISAZO DYE

Chiles E. Sparks, Wilmington, Del., assignor to E. I. du Pont de Nemours & Company, Wilmington, Del., a corporation of Delaware No Drawing. Application January 4, 1940, Serial No. 312,361

13 Claims. (Cl. 8—49)

This invention relates to new polyazo dyes and to dyeing with the dyes which are represented in general by the formula X←Y→A→B→R wherein Y is a compound which when coupled with X and A results in the residue of an aryl radical of the benzene series. The symbol X represents a naphthol sulfonic acid, A and B each represent naphthylamines and R is a meta dihydroxy benzene.

So-called direct dyes are those which dye the cloth directly from a water bath without subsequent treatment. These colors, numerous examples of which are recorded in the literature, are very useful because they are substantive to cellulose and possess bright shades moderately fast to light. To washing these products are very fugitive, showing considerable loss in strength and imparting an undesirable stain to associated uncolored or differently colored fibers. It is therefore desirable to provide dyes which will produce dyeings with the simplicity of direct colors which possess good washing fastness and do not stain other fibers.

Dyeings with improved washing fastness have been made with the so-called diazo colors. These are provided by azotizing suitable direct colors on the fiber and developing with suitable coupling components. These developed or diazo colors are faster to washing but duller in shade than the corresponding direct dyeings. The chief objections include the considerable shade change which usually results on development, and the effort and material expense to be borne by the dyer who must carry out the development.

It is desirable to provide dyes which can be applied with the simplicity of direct colors and which provide dyeings having washing fastness comparing favorably with the washing fastness of the diazo colors and the direct dyeings of which do not change shade. It has now been found that this can be accomplished by after-treating with formaldehyde the direct dyeings of certain types of azo dyes. There is very little shade change produced by such after-treatment of these dyes and the washing fastness of the treated dyeings of this type of dye equals and sometimes surpasses that of the diazo colors.

It is among the objects of the present invention to provide new tetrakisazo compounds, suitable for dyes and having the desired characteristics mentioned. Another object is to provide methods for manufacturing the new compounds. Other objects of the invention are to provide technically satisfactory dyeings and methods therefor. Still other objects of the invention will be apparent from the following description.

The objects of the invention are attained in general by effecting a coupling X←Y→A→B→R wherein Y is a primary aryl amine of the benzene series, having a acylamino group such as 3- or 4-oxalylamino-1-amino benzene which can be diazotized and coupled with a coupling component X, which is a mono- or dihydroxy naphthalene sulfonic acid, and then the acylamino group may be hydrolized or transformed by other suitable means to amino. The resulting monazo compound X←Y—NH$_2$ is isolated, diazotized and coupled with the compound A which is a primary naphthylamine capable of coupling. The resulting diazo compound X←Y→A—NH$_2$ is separated, diazotized and coupled with the primary naphthylamine B and the resulting trisazo compound is then separated, diazotized and coupled with R which is a compound of the meta dihydroxy benzene series. The products are separated from the final reaction mixtures in the form of their alkali metal salts, such as the sodium or potassium salt. Instead of the acylamino-amino benzenes the corresponding nitro amino benzenes can be used with reduction of the nitro groups to amino after the first coupling, but acylamino amino benzenes are preferred.

In this form dyebaths are made by dissolving the products in water, desirably with the aid of a small amount of a base, such as sodium carbonate, and a direct dyeing is made. This dyeing is then treated with formaldehyde in a suitable manner and a formaldehyde complex is formed. The latter dyeing has superior washing fastness which is comparable to the washing fastness of developed dyeings and the shades are brighter than similar shades of developed dyes. The light fastness of the dyeings can be improved by treating the dyeings, either before or after the formaldehyde treatment with certain soluble metal salts to form formaldehyde and metal complexes on the fiber.

The invention will be more fully set forth in the following more detailed description which includes examples that are given as illustrative embodiments of the invention and not as limitations thereof.

*Example I*

A slurry was made with 126 parts of 4-oxalylamino-1-amino-benzene and 1500 parts of water. To the slurry was added 11.8 parts of 100% ammonia as a water solution, or a sufficient quantity to make a complete solution slightly alkaline to Brilliant Yellow. Then 48.3 parts of 100% sodium nitrite were added as a 30% solution and the solution was iced to 5° (±1°) C. The amine was diazotized by slowly running this solution into a mixture of 500 parts of water and 104 parts of 100% hydrochloric acid which had been iced to 7° (±2°) C. The temperature was maintained at about 7° C. and a faint test for excess nitrite for 20 minutes.

A solution was made from 172 parts of 1-naphthol-4-sulfonic acid by adding about 2000 parts of water or until solution was complete. Sodium bicarbonate (270 parts) was added and the solution was iced to 10° (±2°) C.

The diazo solution was added to the 1-naphthol-4-sulfonic acid solution as rapidly as coupling progressed, and the mixture was stirred for one hour after the diazo had completely disappeared.

The solution was then heated to 90°-95° C. and 320 parts of sodium hydroxide, or enough to make the solution 4% sodium hydroxide on the total volume were added. After stirring for one-half hour at this temperature the alkalinity was cut back with hydrochloric acid to a faint red on Brilliant Yellow paper. High speed agitation at this point is essential.

Salt was then added to the solution in an amount equal to about 10% by volume, the temperature was allowed to drop to 50°-60° C., and after stirring 15 minutes the solids were separated by filtration.

The press cake was slurried in 2000 parts of water and the suspension was cooled to 10° C. Then 400 parts of salt were added and stirring was continued until a spot of the charge on filter paper showed a nearly clear rim. Diazotization was effected by adding 89 parts of hydrochloric acid and 42 parts of sodium nitrite as rapidly as the nitrite taken up. A distinct excess of nitrite and a temperature of 12° (±2°) C. was maintained for two hours and then the excess of nitrite was removed by adding a suitable amount of sulfamic acid.

A slurry of 125 parts of 1,6-Cleves acid in 3000 parts of water was dissolved by adding 32 parts of soda ash, thereby leaving the solution slightly acid to litmus. After adding 326 parts of sodium acetate and cooling to 18° (±2°) C., the diazo was slowly run into the solution and the mixture was stirred for 10 to 12 hours. A distinct excess of 1-naphthylamine-6-sulfonic acid should be present at this point, and the slurry should be neutral to Congo Red.

The mixture was heated to 75° C. to 80° C. and approximately 106 parts of soda ash were added to give an alkalinity of about pH 6.1 to 6.3. Salt was then slowly added in an amount equal to approximately 4% of the volume and until a heavy red rim of a spot of the charge on filter paper did not turn blue when made strongly alkaline with soda ash solution. Good agitation is essential. The charge was stirred one-half hour at 80° C. and filtered.

To a slurry of the press cake in 3,000 parts of water, 28 parts of caustic soda were added and the mixture was stirred until a complete solution was obtained. The mixture was made acid by adding 104 parts of hydrochloric acid as an 11% solution, cooled to 10° (±2°) C. by adding ice and diazotized by adding 39 parts of sodium nitrite. An excess of nitrite and a temperature of 10° (±2°) C. was maintained for two hours. Finally the excess nitrite was destroyed by adding sulfamic acid.

To a slurry containing 127 parts of 1-naphthylamine-7-sulfonic acid in 3000 parts of water, 32 parts of soda ash were added to give a faint alkalinity to Brilliant Yellow. Upon heating to 70° C. the intermediate completely dissolved and the solution was then cooled to 55° (±5°) C.

The diazo solution was cooled to 4° (±1°) C. and 326 parts of sodium acetate were added to give a pH of 4.5-4.8. The solution of 1-naphthylamine-7-sulfonic acid was rapidly added while the temperature was below 10° C. and the mixture was stirred 10 to 12 hours, allowing the temperature to rise to 20° to 25° C.

The solution was then heated to 75° (±2°) C. and approximately 90 parts of soda ash were added to raise the pH to 6.0-6.2. At 15 minute intervals 1% salt was added until a total of 5% to 7% based on volume was present. The mixture was stirred 30 minutes and until a spot of the suspension on filter paper showed a very heavy red-brown rim which did not turn blue on making it strongly alkaline with soda ash solution. The solids were then separated by filtering.

To a slurry of the press cake in 3000 parts of water, 110 parts of hydrochloric acid were added as a 11% solution during a period of 20 minutes. The mixture was cooled to 9° (±1° C.) by adding ice. With good agitation 39 parts of sodium nitrite were added and diazotization was conducted at 12° (±2° C.) whilst maintaining a distinct excess of nitrite for two hours.

A solution of 77 parts of resorcinol in 500 parts of water was cooled to 0° C. and 318 parts of soda ash were added.

The slurry of the diazo was poured in a small stream over a period of ½ hour into the resorcinol solution whilst holding the temperature at 0° (—5° C.). The mixture was stirred 10-12 hours at a pH of 8.3 (—8.6) whilst allowing the temperature to rise to 20° (—25° C.).

The charge was then heated to 75° (—80° C.) and the alkalinity was reduced to pH 4.5-5.0 by adding approximately 9 parts of hydrochloric acid as a 10% solution. About 5% salt, based on the volume of the mixture, was slowly added until a spot of the suspension on filter paper showed a heavy red-brown rim that did not turn blue with soda ash. After stirring 30 minutes the solids were filtered off and dried at 80°-85° C. in an air dryer. The dry powder was blue-black in appearance.

The product is represented by the formula

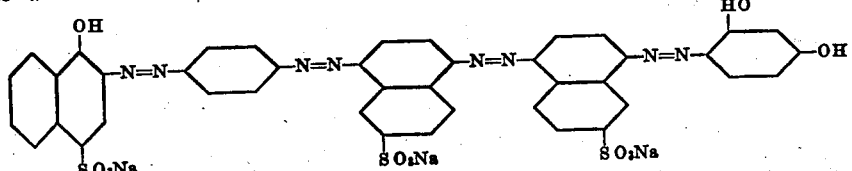

A dyeing was made with the product as follows: About 0.4 gram of the product was dissolved in 100 cc. of water at 190°-200° F. and 0.08 gram of sodium carbonate was added to assist the solution. The solution was diluted with stirring to a total volume of 500 cc. with water at approximately 160° F. and 40 cc. of a 10% solution of Glauber's salt were added. A 10 gram piece of rayon was wet out with water, squeezed partially dry and entered in the dye bath. The temperature of the dye bath was raised to 180°–190° F. during a period of 15 minutes and held at that temperature for one hour with stirring at frequent intervals. At the end of one hour the dyeing was removed and rinsed in cold water.

The rinsed dyeing from the above operation was entered into 500 cc. of water at 130°–140° F. and approximately 10 cc. of a 10% formaldehyde (25 cc. of approximately 37% formaldehyde by weight diluted to 250 cc. with water) solution were added. After holding the piece in the bath at this temperature for 20 minutes, the dyeing was removed, rinsed and dried.

A dyeing with a navy blue shade was obtained which showed excellent fastness to washing.

An alternative after-treatment process which is the preferred procedure because of its economy and ease of application is carried out as follows: At the end of the dyeing period add to the dye bath 10 cc. of 10% formaldehyde at bath temperature. Remove the dyeings after 20 minutes, rinse and dry.

*Example 2*

A product represented by the following formula was prepared by the same procedure as Example 1 by using 172 parts of 1-naphthol-5-sulfonic acid instead of 172 parts of 1-naphthol-4-sulfonic acid in the first coupling and 127 parts of 1-naphthylamine-6-sulfonic acid in place of 127 parts of 1-naphthylamine-7-sulfonic acid in the third coupling.

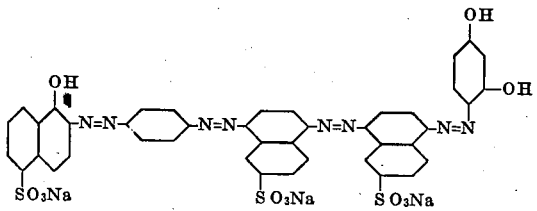

The product was a blue-black powder which when dyed and after-treated as in Example 1, yielded dyeings of a red shade of navy blue which were fast to washing.

*Example 3*

A product represented by the following formula was prepared by the same procedure as Example 1, by using 183 parts of 1,8-dihydroxy-naphthalene-4-sulfonic acid instead of 172 parts of 1-naphthol-4-sulfonic acid in the first coupling and 127 parts of 1-naphthylamine-6-sulfonic acid in place of 127 parts of 1-naphthylamine-7-sulfonic acid in the third coupling.

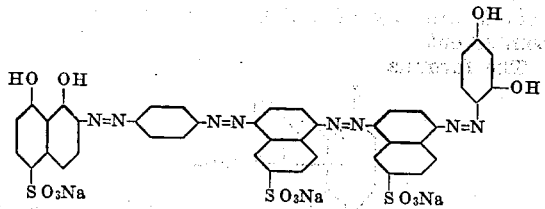

The product was a blue-black powder which when dyed and after-treated as in Example 1 yielded dyeings of a greenish shade of navy blue which were fast to washing.

In the following examples the products were prepared by methods similar to those already described. These products have the novel and desired characteristics of the products of the foregoing examples. Variation in shades of the dyeings are noted.

| Example | Combination | Shade of formaldehyde after-treated dyeings |
|---|---|---|
| 4 | 1-hydroxy-naphthalene-4-sulfonic acid←1-oxalylamino-4-amino benzene→1-amino-naphthalene-6-sulfonic acid→1-amino-naphthalene-6-sulfonic acid→1, 3-dihydroxy-benzene. | Navy blue. |
| 5 | 2-hydroxy-naphthalene-7-sulfonic acid←1-oxalylamino-4-amino benzene→1-amino-naphthalene-6-sulfonic acid→1-amino-naphthalene-6-sulfonic acid→1, 3-dihydroxybenzene. | Do. |
| 6 | 2-hydroxy-naphthalene-6-sulfonic acid←1-oxalylamino-4-amino benzene→1-amino-naphthalene-6-sulfonic acid→1-amino-naphthalene-6-sulfonic acid→1, 3-dihydroxybenzene. | Do. |
| 7 | 1-hydroxy-naphthalene-4-sulfonic acid←1-oxalylamino-4-amino benzene→1-amino-naphthalene-7-sulfonic acid→1-amino-naphthalene-6-sulfonic acid→1, 3-dihydroxybenzene. | Do. |
| 8 | 1-hydroxy-naphthalene-4-sulfonic acid←1-oxalylamino-4-amino benzene→1-amino-naphthalene-7-sulfonic acid→1-amino-naphthalene-7-sulfonic acid→1, 3-dihydroxybenzene. | Do. |
| 9 | 2-hydroxy-naphthalene-7-sulfonic acid←1-oxalylamino-4-amino benzene→1-amino-naphthalene-7-sulfonic acid→1-amino-naphthalene-7-sulfonic acid→1, 3-dihydroxybenzene. | Do. |
| 10 | 2-hydroxy-naphthalene-6-sulfonic acid←1-oxalylamino-4-amino benzene→1-amino-naphthalene-6-sulfonic acid→1-amino-naphthalene-7-sulfonic acid→1, 3-dihydroxybenzene. | Do. |
| 11 | 2-hydroxy-naphthalene-6-sulfonic acid←1-oxalylamino-4-amino benzene→1-amino-naphthalene-7-sulfonic acid→1-amino-naphthalene-7-sulfonic acid→1, 3-dihydroxybenzene. | Do. |
| 12 | 2-hydroxy-naphthalene-7-sulfonic acid←1-oxalylamino-4-amino benzene→1-amino-naphthalene-7-sulfonic acid→1-amino-naphthalene-6-sulfonic acid→1, 3-dihydroxybenzene. | Do. |
| 13 | 2-hydroxy-naphthalene-7-sulfonic acid←1-oxalylamino-4-amino benzene→1-amino-naphthalene-6-sulfonic acid→1-amino-naphthalene-7-sulfonic acid→1, 3-dihydroxybenzene. | Do. |
| 14 | 2-hydroxy-naphthalene-6-sulfonic acid←1-oxalylamino-4-amino benzene→1-amino-naphthalene-7-sulfonic acid→1-amino-naphthalene-6-sulfonic acid→1,3-dihydroxybenzene. | Do. |
| 15 | 1-hydroxy-naphthalene-4-sulfonic acid←1-oxalylamino-4-amino benzene→1-amino-naphthalene-6-sulfonic acid→1,3-dihydroxybenzene. | Violet. |
| 16 | 1-hydroxy-naphthalene-4-sulfonic acid←1-oxalylamino-4-amino benzene→1-amino-naphthalene-6-sulfonic acid→1-amino-naphthalene→1,3-dihydroxybenzene. | Red blue. |
| 17 | 1-hydroxy-naphthalene-4-sulfonic acid←1-oxalylamino-3-amino benzene→1-amino-naphthalene-6-sulfonic acid→1-amino-naphthalene-6-sulfonic acid→1,3-dihydroxybenzene. | Violet. |
| 18 | 2-hydroxy-naphthalene-6,8-disulfonic acid ←1-oxalylamino-4-amino benzene→1-amino-naphthalene-6-sulfonic acid→1-amino-naphthalene-6-sulfonic acid→1,3-dihydroxybenzene. | Navy blue. |
| 19 | 2-hydroxy-naphthalene-3,6-disulfonic acid ←1-oxalylamino-4-amino benzene→1-amino-naphthalene-6-sulfonic acid→1-amino-naphthalene-6-sulfonic acid→1,3-dihydroxybenzene. | Green navy. |
| 20 | 1-hydroxy-naphthalene-4-sulfonic acid←1-oxalylamino-4-amino benzene→1-amino-naphthalene-6-sulfonic acid→1-amino-naphthalene-7-sulfonic acid→1,3-dihydroxy-5-methyl benzene. | Navy blue. |
| 21 | 1-hydroxy-naphthalene-4-sulfonic acid←1-oxalylamino-4-amino benzene→1-amino-naphthalene-6-sulfonic acid→1-amino-naphthalene-7-sulfonic acid→1,3,5-trihydroxybenzene. | Violet. |
| 22 | 1-hydroxy-naphthalene-4-sulfonic acid←1-oxalylamino-4-amino benzene→1-amino-naphthalene-6-sulfonic acid→1-amino-naphthalene-7-sulfonic acid→3,5-dihydroxy-1-carboxy-benzene. | Navy blue. |
| 23 | 1,8-dihydroxy-naphthalene-4-sulfonic acid ←1-oxalylamino-2-methoxy-5-methyl-4-amino benzene→1-amino-naphthalene-7-sulfonic acid→1-amino-naphthalene-7-sulfonic acid→1,3-dihydroxy-benzene. | Green blue. |
| 24 | 1-hydroxy-naphthalene-4-sulfonic acid←1-oxalylamino-2-methoxy-5-methyl-4-amino benzene→1-amino-naphthalene-7-sulfonic acid→1-amino-naphthalene-7-sulfonic acid→1,3-dihydroxy-benzene. | Do. |

Deeper shades than the direct or formaldehyde treated dyeings and with better light fastness are produced by after-treatment of these colors with water-soluble metal salts, such as water-soluble salts of copper, for example copper sulfate. For example, the after-coppering operation may be carried out by either of the procedures outlined in Example 1 for the after-treatment with formaldehyde by using a solution containing a 5% solution of hydrated cupric sulfate equal in amount to the formaldehyde used in the preceding step. In both cases the operation is allowed to continue for twenty minutes, or for such other time as is necessary to metallize the dyeing, at the end of which time the treated dyeings are removed, rinsed and dried. The after-treatment with metal salt may replace the formaldehyde treatment, but both after-treatments are preferred where the best light fastness as well as washing fastness is desired. After-treatment with both formaldehyde and metal salts may be done either in the dye bath or in a fresh bath. When a fresh formaldehyde bath is used and the dyeing is treated for a sufficient time to form the formaldehyde compound, the metal salt may be added and the treatment continued for an interval of time. The dyeings are then removed, rinsed and dried. Similar results are obtained by reversing the order of adding the after-treating reagents, that is, by adding the metal salt solution first, treating for the necessary time, and then adding the formaldehyde solution. After treating the dyeing for about twenty minutes, they are removed, rinsed and dried.

The described method of dyeing is typical but it is to be understood that the invention is not restricted to the precise concentrations, temperatures and intervals of treatment specified in the examples since these details can be variously modified as will be understood by those skilled in the art. For example, the after-treatments with formaldehyde or metal salts may be carried on for longer or shorter periods and at higher or lower temperatures than those specified in the illustrations. Any treatment which will form a formaldehyde complex with the dyeing or one of the described metal complexes with the dyeing, as the case may be, produces the improved results with the dyes described. The exact composition of the described formaldehyde and metal complexes is unknown to us, but from our investigations it is our present belief that formaldehyde and metal complexes are formed.

For the best results at least two different components of the dyes should contain a sulfonic acid group but more than two sulfonic acid groups may be present in the products. The sulfonic acid groups in the new compounds may be in the form of salts of any of the alkali metals and are produced by making the coupling media basic with the appropriate alkali. The acid forms may be made by acidifying the alkali metal forms and isolating the products by well known means.

The compounds of the invention are represented by the general formula

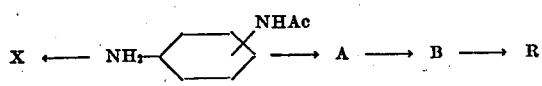

wherein X is a naphthol sulfonic acid having a free coupling position adjacent to a hydroxyl group and represented by the formula

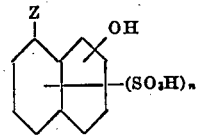

in which Z is one of a group consisting of hydrogen and hydroxy, and $n$ is an integer not greater than 2; Ac is an acyl group capable of being hydrolyzed off in a monazo compound

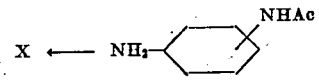

A and B are each one of a group consisting of alpha naphthylamine and Cleves acids; and R is a dihydroxy benzene represented by the formula

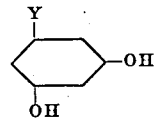

in which Y is one of a group consisting of hydrogen, alkyl and alkoxy having 1 to 6 carbons, halogen, sulfonic acid, hydroxy and carboxyl; said compound having at least two sulfonic acid groups.

Wherever in the specification or claims the Y component is represented by the term a 3-acylamino- or a 4-acylamino-1-amino benzene or by the formula

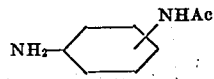

it is to be understood that the terms refer to a compound of the series indicated in which the acylamino group is capable of being hydrolyzed or otherwise transformed to a primary amino group after the first coupling is made. While the oxalylamine group is one of the most desirable acylamino groups for the purposes intended, various other acylamino groups may be present instead, as for example 3- or 4-acetyl amino-1-amino benzene and 3- or 4-formylamino-1-amino benzene.

As other examples of compounds of the 1- and 2-acylamino-4-amino benzene series are mentioned 1-acylamino-4-amino-2-methyl-5-methoxy-benzenes, 1-acylamino-4-amino-2,5-dimethoxy-benzenes, 1-acylamino-4-amino-3-methyl-benzenes, 1-acylamino-3-amino-benzene-sulfonic acids, 2-acylamino-5-amino-benzoic acids, 1-acylamino - 2,3,5,6-tetramethyl - 4 - amino - benzenes and 1-acylamino-2,5-dimethoxy - 3,6 - dimethyl-4-amino-benzenes. The Ac groups of these compounds are any of the acyl groups heretofore pointed out.

The formula

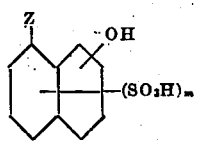

as used in the specification and claims refers to all mono- and disulfonic acids of 1- and 2-naphthol which are unsubstituted in the 8-position as well as those which are substituted by hydroxy in the 8- position. In the above formula $m$ is 1 or 2. The sulfonic acid group or groups may be in either or both members of the benzene ring as indicated by the formula. An additional example of such a compound is 2-hydroxy-naphthalene-3,6-disulfonic acid.

Water-soluble metal salts of various metals can be used for metallizing the dyeings, those having atomic weights between 50 and 65 being the most suitable. As examples of such metals, copper, chromium, nickel, cobalt and iron are mentioned. Either water-soluble salts of inorganic or organic acids can be used such as sulfates, halides, formates and acetates, for example copper sulfate, nickel sulfate, chromium chloride, copper formate, copper acetate and many other water-soluble metal salts of inorganic and organic acids.

The compounds of the present invention give excellent dyeings on cotton and regenerated cellulose which are equal to and superior in washing fastness to the developed colors. In applying developed colors three baths are necessary, namely a bath containing the azo component, an azotizing bath and a developing bath. In the present process the dyeing may be completed in one bath. The dyeings of the present invention compare favorably in brightness with the direct dyes but they are much faster to washing.

Since from the foregoing description of the invention it will be apparent to those skilled in the art that various other embodiments of the invention may be made without departing from the spirit and scope thereof, it is to be understood that the invention is not limited to the illustrations specifically recited.

I claim:

1. An azo compound of the groups consisting of the alkali metal salts and the acid forms of the compounds which in their acid form are represented by the formula

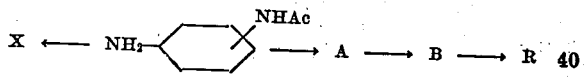

wherein X is a naphthol sulfonic acid represented by the formula

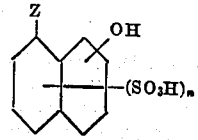

in which Z is one of a group consisting of hydrogen and hydroxy and $n$ is an integer not greater than 2; NHAc is an acylamino group capable of being hydrolyzed to amino and which is hydrolyzed to amino in the monazo compound

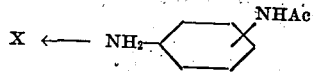

before coupling is made with A; A and B are each one of a group consisting of alpha naphthylamine and Cleves acids; and R is a dihydroxy benzene represented by the formula

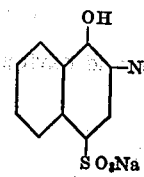

in which Y is one of a group consisting of hydrogen, alkyl and alkoxy having 1 to 6 carbons, halogen, sulfonic acid, hydroxy and carboxyl; said compound having at least two sulfonic acid groups.

2. An azo compound of the group consisting of the alkali metal salts and the acid forms of the compounds which in their acid form are represented by the formula

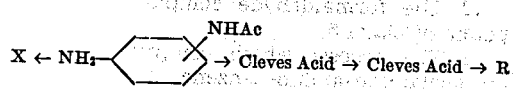

wherein X is a naphthol sulfonic acid represented by the formula

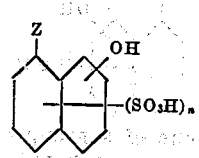

wherein $n$ is an integer not greater than 2 and Z is one of a group consisting of hydrogen and hydroxy; Ac is an acyl group capable of being hydrolyzed off and which is hydrolyzed to provide a primary amino group in a monazo compound

before coupling is made with A and R is a dihydroxy benzene represented by the formula

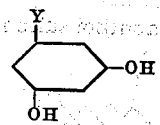

in which Y is one of a group consisting of hydrogen, alkyl and alkoxy having 1 to 6 carbons; halogen, sulfonic acid, hydroxy and carboxyl; said compound having at least two sulfonic acid groups.

3. A compound represented by the formula

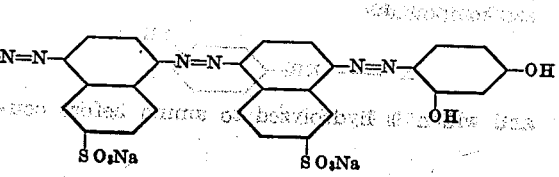

4. A compound represented by the formula

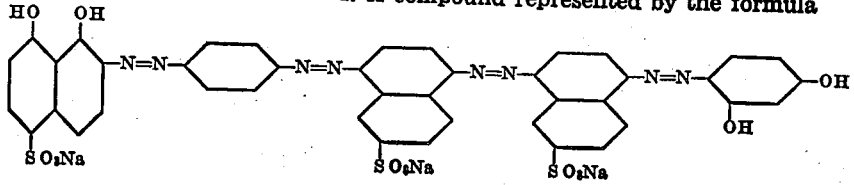

5. A compound represented by the formula

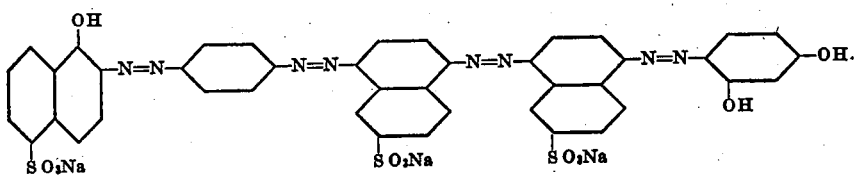

6. The formaldehyde complexes of the compounds of claim 1.
7. The formaldehyde complexes of the compounds of claim 2.
8. The formaldehyde complex of the compound of claim 3.
9. The formaldehyde complex of the compound of claim 4.
10. The formaldehyde complex of the compound of claim 5.
11. The process which comprises diazotizing an acylamino-amino-benzene, coupling with a naphthol sulfonic acid represented by the formula

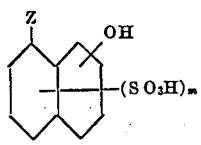

in which Z is one of a group consisting of hydrogen and hydroxy and $m$ is 1 to 2, hydrolyzing the acylamine group of the monazo compound to amino, diazotizing and coupling with a Cleves acid, diazotizing the disazo compound thus produced and coupling with a second equivalent of a Cleves acid, diazotizing the resulting product and coupling with a compound of the 1,3-dihydroxy benzene series.
12. The process which comprises entering dyeable fibers in a solution containing the alkali metal form of a compound represented by the formula

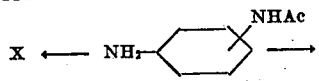

wherein X is a naphthol sulfonic acid represented by the formula

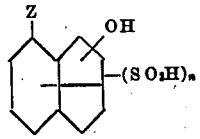

in which Z is one of a group consisting of hydrogen and hydroxy and $n$ is an integer not greater than 2; NHAc is an acylamino group capable of being hydrolyzed to amino in a monazo compound

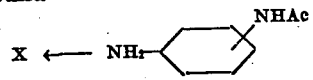

and which is hydrolyzed to amino before coupling is made with A; A and B are each one of a group consisting of alpha naphthylamine and Cleves acids; and R is a dihydroxy benzene represented by the formula

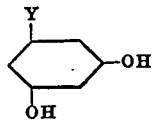

in which Y is one of a group consisting of hydrogen, alkyl and alkoxy having 1 to 6 carbons, halogen, sulfonic acid, hydroxy and carboxyl; said compound having at least two sulfonic acid groups; treating the fibers in said solution until they are dyed; and then applying formaldehyde to the dyed fibers until a formaldehyde complex is formed.
13. The alkali metal salts and the acid form of compound which in its acid form is represented by the formula

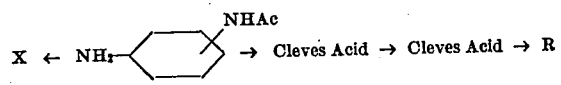

wherein X is a naphthol sulfonic acid represented by the formula

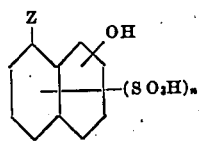

wherein $n$ is an integer not greater than 2 and Z is one of a group consisting of hydrogen and hydroxy; Ac is an acyl group capable of being hydrolyzed off in a monazo compound

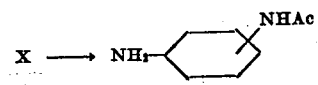

and R is a dihydroxy benzene represented by the formula

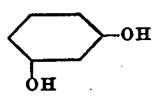

said compound having at least two sulfonic acid groups.

CHILES E. SPARKS.